United States Patent [19]
Bullock

[11] 3,752,226
[45] Aug. 14, 1973

[54] ENVIRONMENTAL AIR CONTROL UNIT
[76] Inventor: Oakle P. Bullock, 15858 Septo St., Granada Hills, Calif. 91344
[22] Filed: June 25, 1970
[21] Appl. No.: 49,634

[52] U.S. Cl. ................................. 165/59, 165/126
[51] Int. Cl. ............................................. F24f 13/08
[58] Field of Search ..................... 165/59, 61, 126, 165/127; 34/97

[56] References Cited
UNITED STATES PATENTS
| | | | |
|---|---|---|---|
| 3,540,525 | 11/1970 | Bradshaw | 165/16 |
| 3,102,654 | 9/1963 | Millman et al. | 62/285 X |
| 2,904,316 | 9/1959 | Hagen et al. | 165/126 |
| 2,755,072 | 7/1956 | Kreuttner | 165/59 |
| 1,278,414 | 9/1918 | Arneil | 165/126 |

FOREIGN PATENTS OR APPLICATIONS
1,275,957  8/1968  Germany ............................ 34/218

OTHER PUBLICATIONS
"Tuttle and Bailey Ducturns," Received U.S. Patent Office 10-5-42, Catalog No. 41.

Primary Examiner—William F. O'Dea
Assistant Examiner—William C. Anderson
Attorney—Parker, Carter & Markey

[57] ABSTRACT

This disclosure is concerned with a so-called environmental air control unit which is made up of a basic module which may include heating and cooling components, a directional controller structure, filters and appropriate connections, all of which may be structured into various housings and shrouds with vortex generators and appropriate controls for discharging hot and cold air separately or together with a proportioning arrangement. The emphasis is on the basic module itself, but the housing, shrouding and vortex generators are important.

24 Claims, 12 Drawing Figures

Patented Aug. 14, 1973

INVENTOR.
Oakle P. Bullock,
BY Parker Carter & Markey
Attorneys.

ENVIRONMENTAL AIR CONTROL UNIT

SUMMARY OF THE INVENTION

My invention is in the field of environmental air control units and is concerned with air conditioning equipment for heating and/or cooling, humidifying, dehumidifying, mixing of air, filtering of air, pressurization of air or as a prime mover of air. When one or more of the natural characteristics of air is changed by one or more of the foregoing processes or in any one of a number of ways, the result or process may be termed air conditioning.

An environmental air control unit is a mechanical device designed to change and control space environment to a predetermined and desired condition or multiple conditions. Air conditioning has long since ceased to be a luxury and has become a major part of modern construction in all types of building.

A primary object of my invention is an environmental air control unit designed so that the air entering the air control module at low, medium, or high velocity; low, medium or high pressure is introduced into the air control module parallel, or approximately parallel to the coils.

Another object is an environmental air control unit designed to be compactly built, therefore requiring much less usable space than the conventional unit.

Another object is an environmental air control unit which can be used to heat, cool, humidify, dehumidify, filter the air, or a combination of any or all of these objectives.

Another object is an environmental air control unit of such adaptability and conformity that a single, basic, air control module, together with various combinations of designed components, is specifically and ideally adaptable to a dual duct air conditioning installation wherein one duct transporting cooled air and one duct transporting warmed air are automatically terminal blended to provide desired area temperatures.

Another object is a unit of the above type in which the basic air control module and other designed components are specifically adaptable to a single zone air conditioning unit wherein through one duct either warmed or cooled air is transported to one or more areas.

Another object is an environmental air control unit designed with such compactness that the result, while performing much more efficiently, will be, other than saving space alone, a unit requiring much less material than conventional available units.

Another object is an environmental air control unit designed to operate with coil and filter face velocities, which can vary from standard to extremely high velocity and still remain within the dictates of good, sound engineering practice.

Another object is a unit of the above type which even though it is fabricated as a high velocity or high pressure unit, can, without change, be adapted to medium velocity or medium pressure air or low velocity, low pressure air.

Another object is an environmental air control unit which will attenuate air and fan noise as the air passes through the entire unit.

Another object is an environmental air control unit that is much more compact then the available conventional units, due to its requiring much less space.

Another object is a unit of the above type which can be hung from the structure above, can rest on the floor, or can be bracketed on a wall either in a horizontal or vertical position.

Another object is an environmental air control unit of such versatility that air entering the unit, after being conditioned, can be dispelled in the same direction as the air entering the unit or can be dispelled in the exact opposite direction, or a portion of the air can be dispelled in both directions without a system of bulky ductwork.

Another object is an environmental air control unit wherein the conditioned air is expelled from the basic air control module through a filter and coil, on either one or both sides, to enter a vortex generator where the air is induced into a helical pattern, thereby causing the air to emerge from the unit outlet in the most natural and efficient path possible resulting in less back pressure and so less power for transportation through the system.

Another object is an environmental air control unit that can function with any type air prime mover, forward or backward inclined bladed centrifugal fan, airfoil type blade fan, single width single inlet fan, double width double inlet fan, propeller fan or the like. The fan may be attached to the unit or may be remotely located and connected to the unit by means of ductwork.

Another object is an environmental air control unit which may be utilized as a "blow-through" unit, wherein the fan or blower is located upstream of the unit and discharges air into the basic air control module whereby one fan or blower may supply air to one or any number of remotely located units and systems, possibly on separate floors.

Another object is an environmental air control unit which may be utilized as a "draw-through" unit, wherein the fan or blower is located downstream of the unit and the air is drawn through the unit, conditioned, and then into the suction side or inlet to the fan or blower, which then discharges the conditioned air into the system making possible the use of one unit and one or any number of fans remotely located, each then becoming an individual conditioned air supply system.

Another object is a variation in which the air enters the air control module parallel to the vortex generators, the directional controllers, filters and the coil or coils being located at an angle, thereby forming a V if two coils are used, so that the air will turn 90° to the path of entry and then enter the vortex generator before being expelled from the unit.

In all objects stated herein the environmental air control unit, regardless of its position or application, will perform the same air conditioning functions of heating and/or cooling, humidifying, dehumidifying, filtering the air, mixing the air, pressurizing the air to any desired pressure and velocity, the object being to provide the required static pressure and air velocity to satisfy the design conditions of a given system.

Additional objects will appear from time to time in the ensuring specification and drawings:

DESCRIPTION OF THE PREFERRED EMBODIMENT

Figure 1:
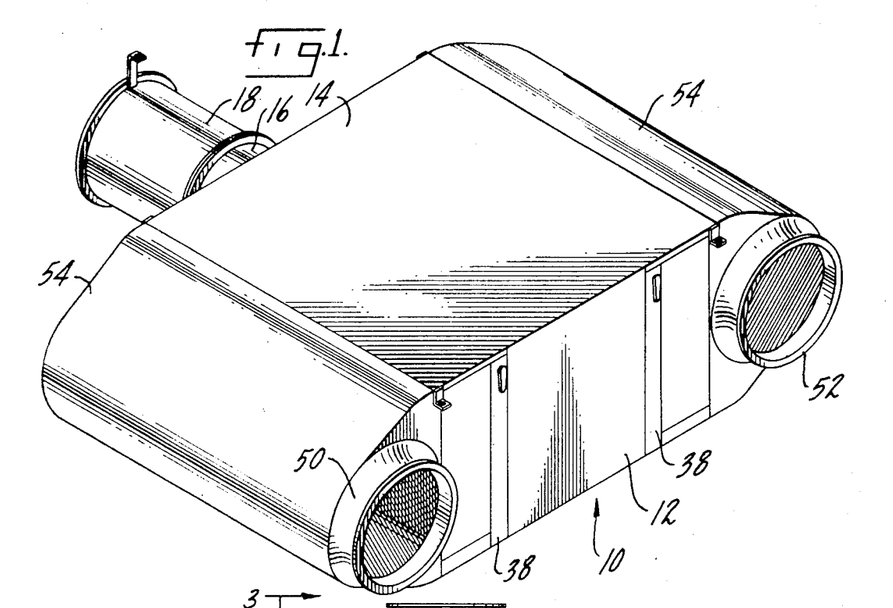
FIG. 1 is an isometric view of the overall unit.
Figure 2:
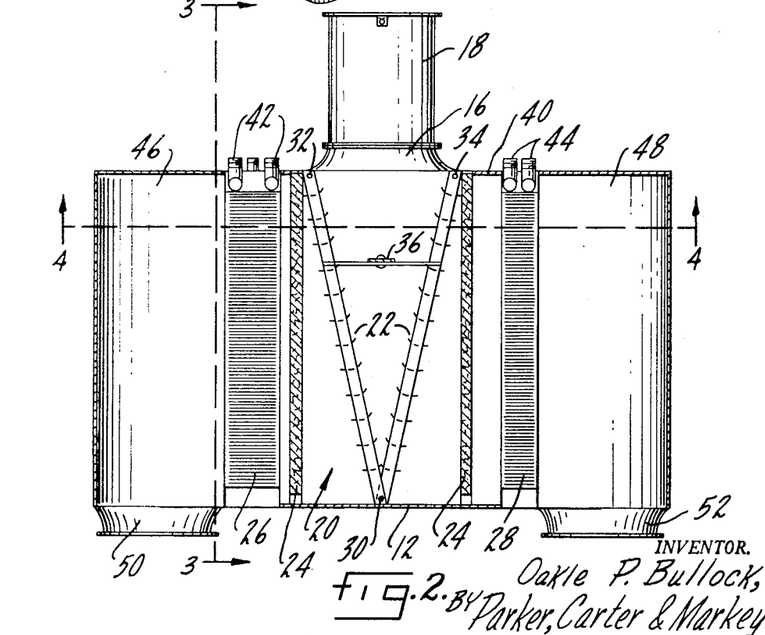
FIG. 2 is a section along line 2—2 of FIG. 3.
Figure 3:
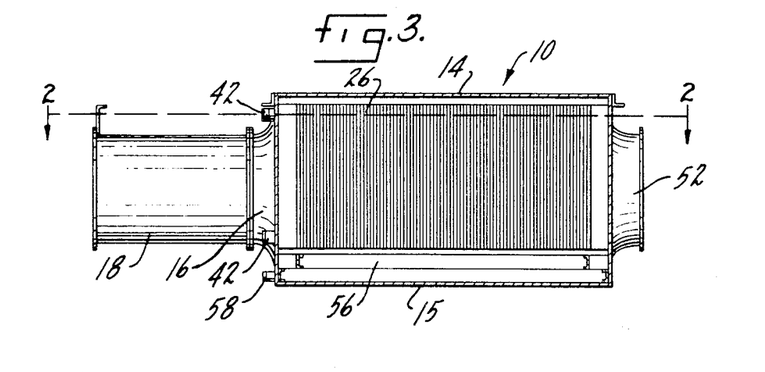
FIG. 3 is a section along line 3—3 of FIG. 2.

In FIG. 1 the unit has been indicated generally at 10 and includes a shroud 12 on the end, 14 on the top, and 15 on the bottom covering the unit, which has a formed inlet 16 disposed generally in the center thereof on one side connecting to a fan 18, also shown in FIG. 2, connecting to the air control module indicated generally at 20 in FIG. 2. This air control module is an air pressure chamber which includes air inlet 16, directional controllers 22, filters 24, and coils 26 and 28, all combined into a unit or framework. To get even air velocity across the coils or decks at all points throughout their length, I position two rows of adjustable directional controllers on each side at 22, which are disposed to form a V coming together more or less at 30 on the rear wall. The forward ends of the directional controllers 22 straddle the inlet and can be suitably mounted on the front wall of the housing, as at 32 and 34. The directional controllers themselves may be adjusted to progressively and uniformly turn the entering air so that the velocity and quantity of the air through the hot and- /or cold coils or decks will be the same at all points along their length. The result I have attained is an accurately controlled "across the coil" air velocity at any given point, due to the shaping of the directional controllers and adjusting them to a pre-analyzed position. The directional controllers can be mounted either adjustable, individually, or as a group, so that any required air velocity can be obtained. Suitable adjusting mechanisms may be used, not shown, to adjust the controllers, preferably controlled, manually or otherwise, mounted at a permanent preconceived position.

A target plate or deflector 36 accurately located in the airstream between the controllers to blank or mask off the junction 30 at the terminus of the directional controllers to avert the air from striking the end wall, will prevent the air from reflecting or bouncing and thereby causing turbulence. The air tends to ricochet off of the leading edges of the controller blades 22 and to deflect inwardly or converge and jam up toward point 30, where the controllers come together. The target plate 36 will cause the air to be deflected outwardly somewhat to prevent the buildup in the center.

It will be noted in FIG. 1 that the filters can be inserted longitudinally into the shroud through access doors at either end, for example as at 38 or through the top or bottom. The filters can be parallel or non-parallel, yet in the same horizontal plane. To obtain correct velocity across the filters, they can be in the shape of a V or W which is parallel to the coil. Or a deep bed filter for higher efficiencey can be utilized. Also, an additional bank of filters may be mounted downstream of the coils.

Figure 4:
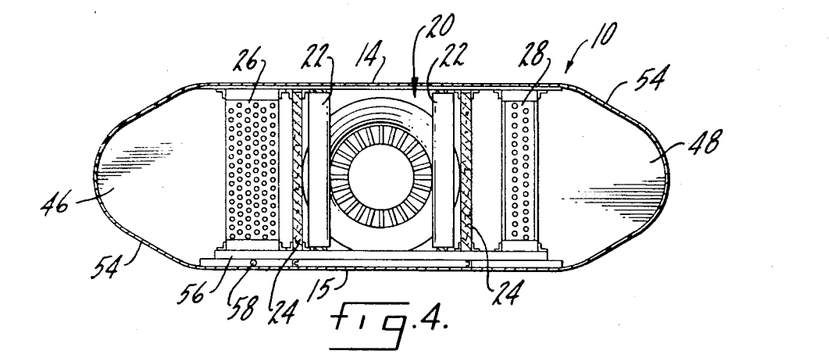
FIG. 4 is a section along line 4—4 of FIG. 2.
Figure 5:
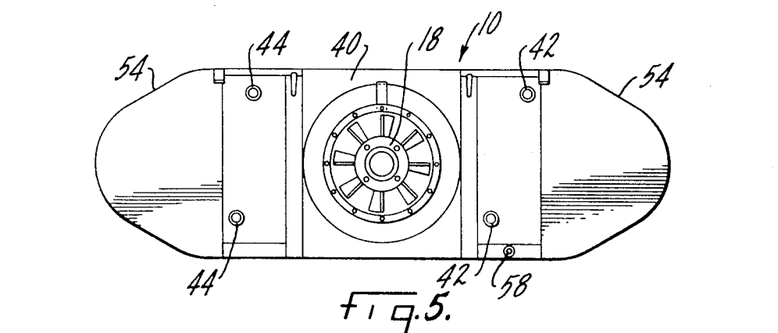
FIG. 5 is an end view of the unit.

The coils define the air control module 20 and the upper and lower shroud walls 14 and 15 which form the top and base, also outline the basic air control module to give it a cross section which may be generally rectangular, as shown in FIG. 4, and somewhat elongated as shown in FIG. 2, between the rear wall 12 and the inlet 16 at a front wall 40. The filters may be eliminated from this section entirely and placed in the inlet or outlet service component to the unit. This arrangement would be predicated on the use of electrostatic type filters or other special filtering requirement dictated by an individual design or requirement.

On the discharge side of the filters 24, I position coils which are also termed decks, the one designated 26 being the cooling coil (cold deck) and the other 28 a heating coil (hot deck). These delineated coil positions may be reversed. The piping connections to the coils, 42 for the cold deck, and 44 for the hot deck, are shown passing through the front shroud, but can be through the rear. Each coil can readily be made removable in its mounting, so that they may be serviced or replaced if need be.

Outboard of each of the coils, I position a vortex generator, the cold at 46 and the hot at 48, with outlets 50 and 52, on each side of the air control module, discharging in a direction generally parallel to the inlet. It will be noted in FIG. 4 that each of the vortex generators reduces in cross section or is rounded outwardly, as at 54. I round the outer shroud so that the air will be compelled to gyrate or spiral, rather than reflect or bounce directly back against the coil.

The entire shroud of the unit may be lined with an insulating blanket, not shown, to retard the transfer of heat through the shroud. The insulating blanket lining the vortex generators should be of such a density as to act as a sound attenuator. The acoustic blanket in the vortex generator may be covered with a thin perforated sheet of metal which will form an acoustic attenuating surface. Together the acoustic blanket, the perforated metal and the rounded surfaces will deflect the sound emitted from the unit.

In FIG. 4, I have shown the coils and filters mounted in a pan 56, which is used for the cold deck 26 as a sump for condensate which is then discharged through a drain line 58.

Figure 6:
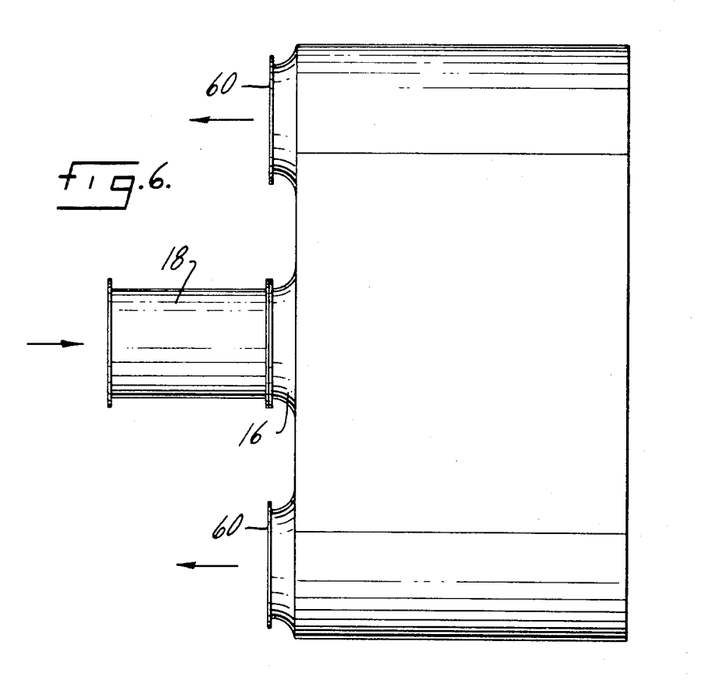
FIG. 6 is a plan view of a modified form.

The outlets may discharge rearwardly, as shown in the modified form in FIG. 6, as at 60, which is the reverse of the discharge in FIG. 2. In this sense, the particular direction of the discharge from each vortex generator is not critical.

Figure 7:
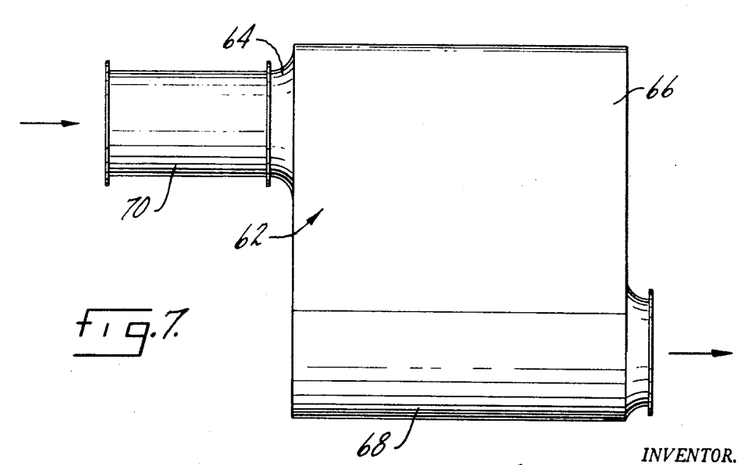
FIG. 7 is a plan view of a further modification for single duct application.

Also, in FIG. 7 I have shown a modified form in which a shroud 62 with an inlet 64 on one side is connected to an air control module 66, which contains only one coil and one filter and with only one vortex generator 68 and a fan 70. In a sense, the FIG. 7 unit is a single, while FIG. 2 is a double or dual unit. It should be understood that in FIG. 7 the filter may be removably mounted and the coil may be either a hot or cold deck, again removably mounted so that it may be serviced. In FIG. 7, the unit may be used as a reheat unit. The coil and filter may be mounted parallel to the air inlet or at an angle.

The air control module for a single unit may have a single directional controller, a filter, a cooling or heating coil, a condensate drain pan, a condensate drain and shrouds, all described in connection with FIG. 2. Downstream of the cooling coil may be positioned X shaped eliminator plates, not shown. When the moist air from the cooling coil impinges on the metal, it will deposit and fall to the drain pan. Downstream of the eliminator plates may be a heating coil. The eliminator plates will form a spacer between the two coils. The air leaving the heating coil will enter the vortex generator, generating a spiraling motion and leave the unit.

Figure 8:
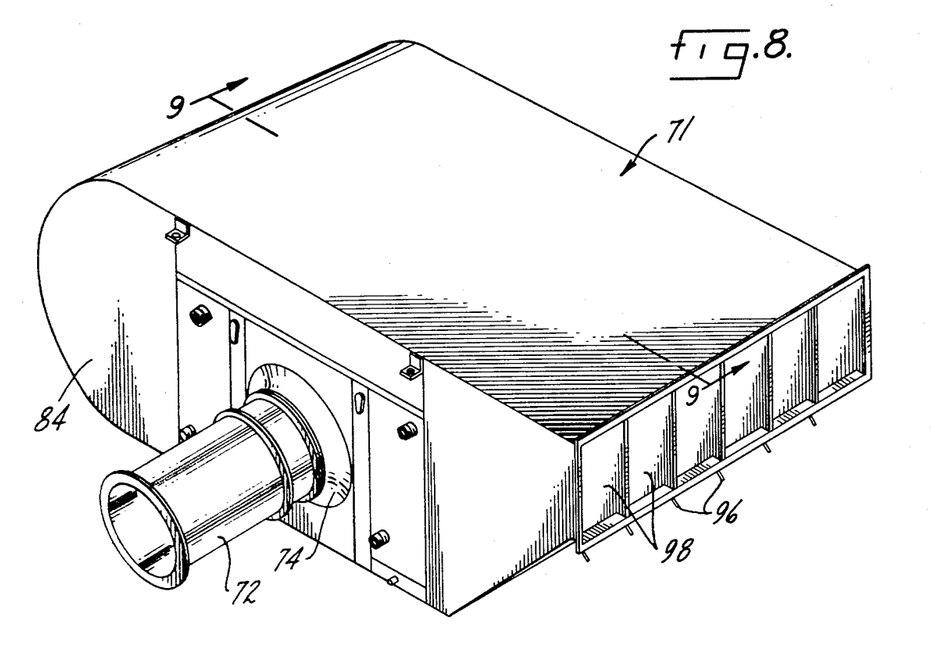
FIG. 8 is an isometric view of still a further modification for a multi-zone application.
Figure 9:
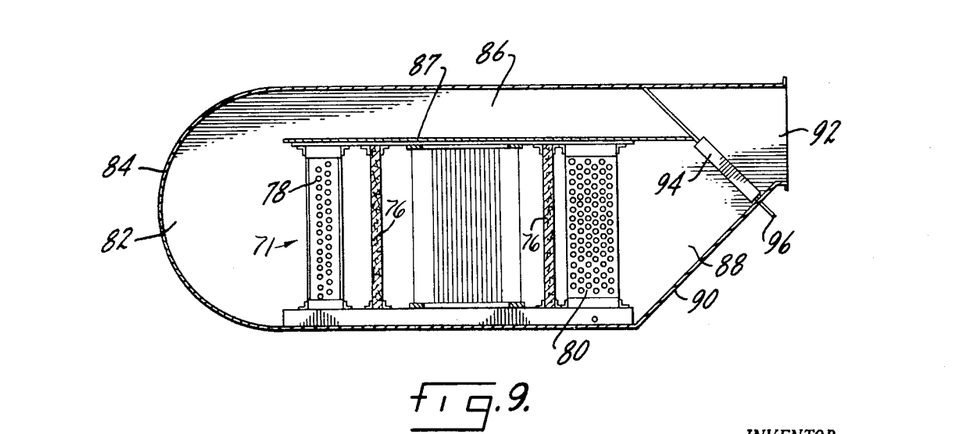
FIG. 9 is a section along line 9—9 of FIG. 8.

In FIGS. 8 and 9, I have shown a multi-zone unit in which a basic air control module 71 may be the same or similar to the one FIG. 2. The module has the blower 72 and inlet 74 connected more or less in the center with the filters 76 and hot and cold decks 78 and 80 on each side with the directional controllers in the center all mounted in the same plane. The vortex generators have been modified somewhat, however. For example, the one 82 by the hot deck has a well rounded exterior or shroud 84, which loops back up on the top of the unit to form a cross passage 86. In this case, I use a false ceiling or shroud 87 across and above the coils. The plenum or vortex generator 88 adjacent the cold deck has a slanting shroud or floor 90, so that the cool air from the cold deck 80 will be led up to a junction with the warm air from cross passage 86 to mix at a side outlet 92. I provide an opposed blade damper structure 94, which includes dampers across both the flow of hot air from 86 and flow of cold air from 88, mixing the two different temperatures of air before being discharged through the outlet 92. The blades in the cold side may be 90° relative to the blades in the hot side or any suitable angle, so that when a suitable control 96 on the outside, or whatever control is used, is moved, one will open while the other closes to give the desired mixture of air. The control 96 may be actuated manually or may be operated automatically. It will be noted that the outlet 92 has a plurality of zones or outlets 98, each of which may lead to an individual room or zone. For this matter, the side outlet may be one continuous discharge or they may be different sizes. The outlet 92 may discharge upward or downward, depending on the requirement. The damper blade structure 94 may be eliminated with the shroud 87 extended to the right, in FIG. 9, to the outlet 92 to provide a common cold and hot deck discharge.

In FIG. 9 the hot coil 78 may be replaced with a perforated metal plate called a "target plate". In this configuration, the air entering the unit will be directed to pass through either the cold deck or the target plate, then through passage 86 and mixing with the air from 88, before leaving at 92. This is known as a face and by-pass damper operation. Conversely, a target plate may be substituted for the cold coil 80.

Figure 10:
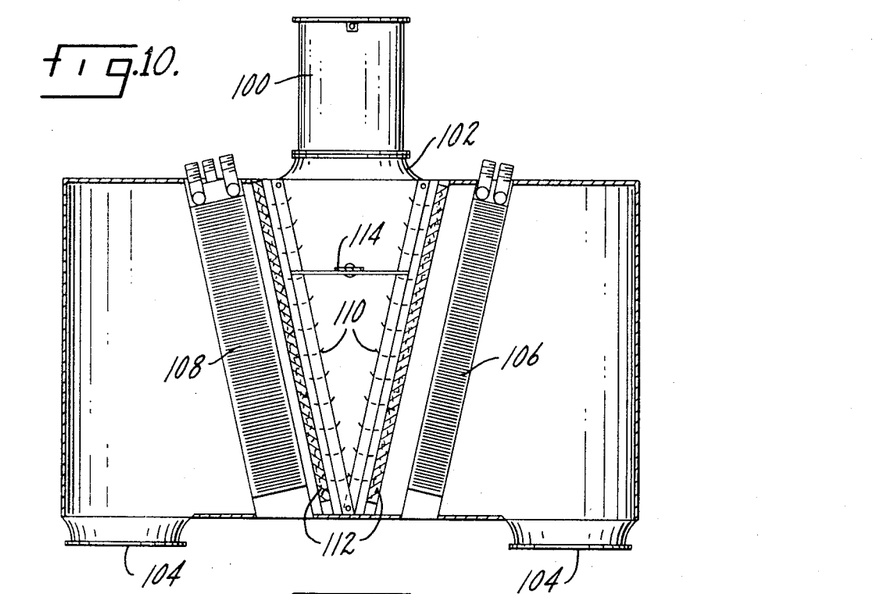
FIG. 10 is a section, similar to FIG. 2, of a modified form.

In FIG. 10 a variant form has been shown in which a blower 100 has an inlet 102 with outlets 104, plenum chambers, etc. similar to or the same as in FIG. 2. It sill be noted that the hot deck 106 and cold deck 108 are disposed at an angle converging toward the rear so that they conform more or less to the controllers 110. As well the filters 112 are also convergent and are positioned between controllers and the decks. On each side the various units may be considered to be generally parallel or in a V with the V opening toward the inlet and, as before, a target plate or deflector 114 may be used. The individual blades or fins in the controllers 110 may be disposed so that the leading edge will uniformly skim off the air from the inlet with the trailing edge being directed so that the air will pass through the decks generally at right angles thereto, thus avoiding wiping or oblique entry.

Figure 11:
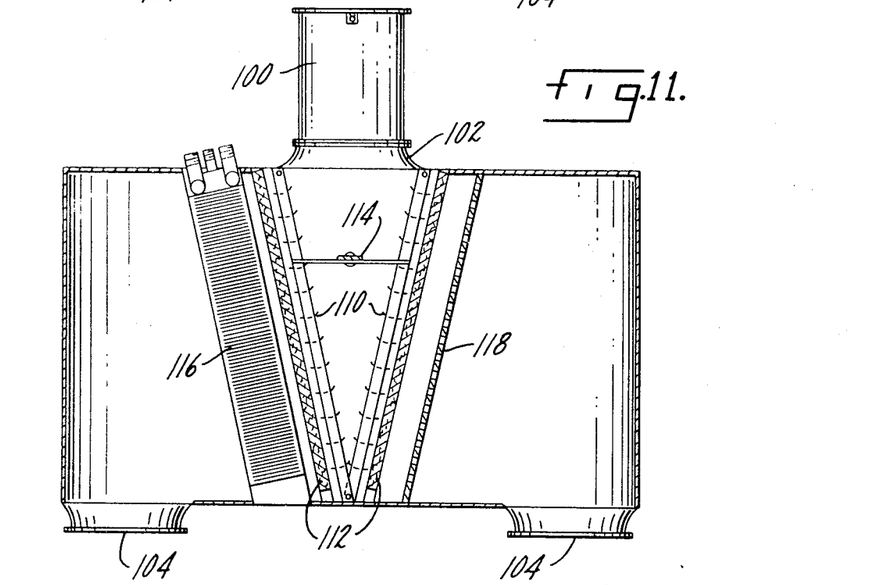
FIG. 11 is like FIG. 10 but of a further modification.
Figure 12:
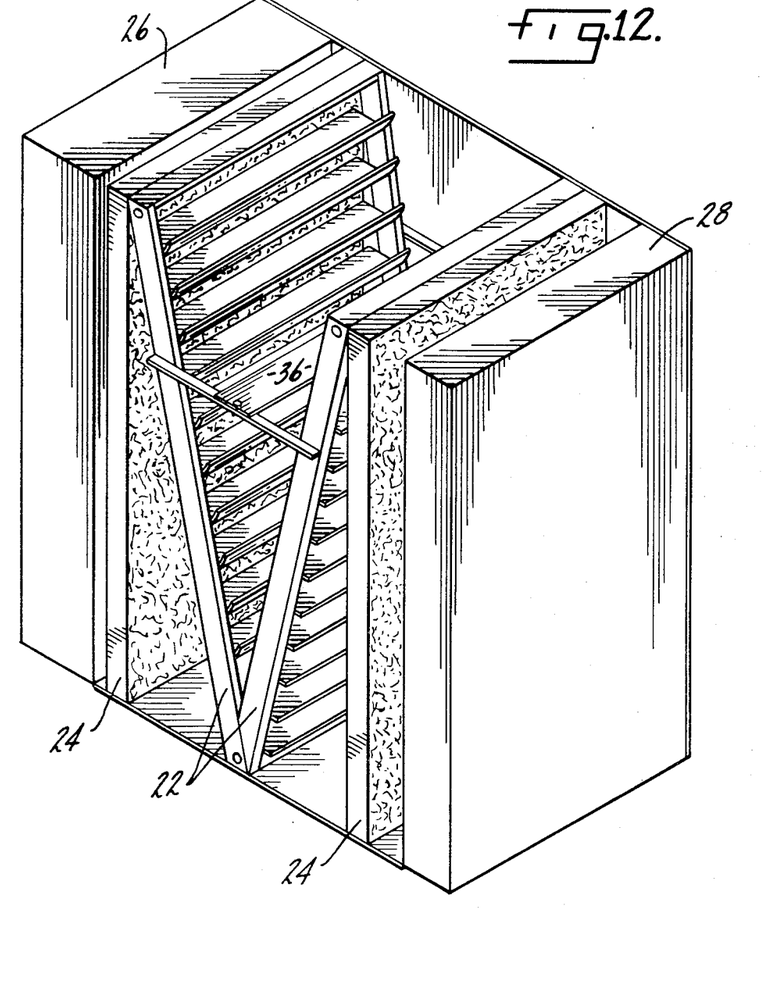
FIG. 12 is a perspective of a portion of the FIGS. 1–5 unit, with parts omitted for clarity.

In FIG. 11 a similar form has been shown except that only one deck 116 is used with a perforate target sheet or plate 118 on the other side. But otherwise the controller, filters, etc. may be the same. It will be understood that while the target sheet has been shown as taking the place of the hot deck, the remaining deck 116 may be considered to be either the hot or the cold deck. And, in fact, 116 may be constructed so that it will accept heating fluid in the winter and cooling fluid in the summer. While the decks, controllers, filters etc. have been shown as convergent or in a V form in FIG. 11, it should be understood that they may be generally parallel similar to the FIG. 2 form. In short, a target sheet, such as 118, might be substituted for deck 28 in FIG. 2, with everthing else being the same. The same is true of the FIGS. 6 and 7 forms. In short, the arrangements shown in FIGS. 10 and 11 can be and, in fact, should be considered to be a showing of the basic module which may be enclosed in any suitable type or configuration of housing with the module including one or more decks, suitably disposed, with flow controllers toward the inlet and filters, if desired, and possibly a condensate pan and drain along with, in certain situations, vortex generators which, in and of themselves, should not be considered a part of the basic module but are additives thereto, along with the fan. In all situations, the coils and filters may be mounted parallel to the air inlet or at an angle.

The use, operation and function of my invention are as follows:

To assist in understanding the function of my unit through the utilization of its components, following is a partial list of the major components. The unit is so heterogeneous in design, function, results obtained, size, employment and features when compared with all available and conventional air handling units, a knowledge of the various parts is important, namely inlet, entrance, blower or fan 18, outlet or discharge, a shroud, one or more vortex generators, filters, directional controllers 23, target plate, a hot coil or deck, a cold coil or deck, some or all centered about a basic air control module which may comprise an air inlet, target plate, directional controllers, filters, hot and/or cold coils, condensate collection pan and condensate drain.

A unique concept is the basic module which makes the unit different from the conventional units, adds vastly to better fabrication and installation, affords greater versatility in the utilization of the complete unit and makes the compactness of the unit possible.

The environmental air control unit will operate as a high velocity air or high pressure air handling unit, yet it may be used also for low velocity or low pressure air or a combination of these conditions.

The available, conventional air handling units are primarily designed as low velocity, low pressure air units and in order to utilize them for high velocity or high pressure air delivery the fans within the units are banded or otherwise reinforced and driven at an accelerated rate, which requires that the motors driving these fans be greately overpowered, not only does this treatment result in inefficiency of operation, but due to the pressures created, render the units unduly costly in power consumption.

The air distribution across the conventional overpowered unit coils is erratic and therefore variable in the accepted, existent equipment. The path of the air through conventional equipment and the manner in which it passes through the various unit is not conductive to even distribution or control, the reason being, the directed path of air in the typical unit hits blank walls or opposing flat surfaces creating back pressure and the ensuing turbulence. The effect of such air path distortion creates deficiencies, which consume excessive power to overcome the static pressures generated as the air passes through the unit.

All the available conventional units force the air in an opening entering the unit the size of which is actually one-half to one-fourth the area of the coil bank. It is because of this that all of the air cannot expand to pass entirely through the coil at the same face velocity over the entire surface of the coil and this results in the poor efficiency of heat transfer to the coil.

In my unit the velocity of the air across the coil may vary according to the design requirements, yet the air pattern is controlled by adjustable or fixed directional controllers with one or more target plates to definitely impel the air to a positive and even distribution through the entire length of the coil and thereby making possible the maximum transfer of heat, either to or from the coil surfaces. Even distribution of the air across the coils is very important. The air enters the unit at a very fast rate and expands within the unit. Because of the velocity of the air it will take the path of least resistance and will converge toward point 30 where the controllers come together. This will cause the air to compact in the center which will cause the velocity of the air through the controller to be higher adjacent point 30 than up toward the middle or inlet end as at 32 and 34. The coils will operate most efficiently when the velocity through the coils is uniform over the entire length, or as close as you can get it. The target plate 36 has the effect or retarding the air in the center and preventing it from building up toward point 30. This slows the velocity and the air will be forced through the controller and into the coil rather than tending to "ride" the edges of the directional controllers and piling up at 30.

Whereas I have referred to directional controllers and target plates, it should be understood that other suitable means may be used for controlling the distribution of air across the coils.

I provide a small, compact, but nevertheless highly efficient environmental air control unit for either heating or cooling or both. The unit is specifically designed for low, medium or high velocity operation. For example, the air can pass through the inlet and outlet at a velocity of 3,000 feet per minute or even more and operate very efficiently. Also it may be used very efficiently for low velocity operation, for example 12 to 15 hundred feet per minute. Air may enter the inlet at, say, 3,000 feet per minute and will discharge from the outlets at something on the order of 3,000 feet per minute or slightly less. Since the area of the cold and hot decks is substantially more than that of the inlet, the velocity through the coils will be substantially reduced and the area should be proportioned so that the velocity through the coils and filters is at a recommended velocity or the most efficient velocity for those units. In short, the coil face and filter face velocities are controlled for the most efficient operation of the coil, according to good engineering practices. The position of the filter tends to minimize air wiping of the coil.

The internal construction and arrangement within this unit, for the purpose of efficiently controlling the path and manner in which the air passes from the inlet to the outlet, is one of the factors that make this unit unique. Conventional air handling units have all straight panels for the air to strike and, in doing so, the air will bounce back from the panels at the same angle which it strikes thereby creating turbulence, back pressure and a loss in air velocity and pressure. The vortex generator corrects this condition as no other conventional unit can. Air directed from a fan opening which is smaller than the coils with efficient distribution of the air across these coils is obtained.

One of the most important points is that the cold and hot decks are generally parallel and in the same horizontal plane. I have shown them parallel, but they might converge or diverge more or less, more likely converge. The same is true of the filters. In any event, I put them in the same horizontal plane and the air separates from the air control module through the directional controllers to go through each coil and/or filter. By locating them side by side, much less vertical head room is occupied and the unit may be easily connected to overhead ductwork without sacrificing space.

The unit takes on a flat pancake appearance, since the two coils are side by side in the same horizontal plane and the vortex generators are also in the same plane and outboard of the coils. This is true of either the single or double units and more or less true of the multi-zone unit and the face and bypass unit. In each case the unit is highly compact and may be mounted flush against the ceiling.

It should be noted that the filters are downstream of the fan or inlet to the unit, on the high pressure side instread of the suction side. The filters are also placed ahead of the coils, so that they, in a sense, function as air distrubutors and prevent the air from wiping the coils across the surface of one coil, while going to the other. This is a very important function of the unit and is one of the faults of convensional units. If required, the filter or filters may be installed on the suction or discharge side of the unit and will be eliminated from the inside of the unit. A target plate may then replace the filters inside the unit or may be eliminated altogether.

I have also shown in the various units heating and cooling coils in which I might have one coil with suitable connections for hot medium changeable to a cold medium, for example hot or cold water. This is paricularly true of a single unit, such as FIG. 7, or I might also do this on a unit, such as FIG. 2, in which one of the coils would be present and would function as either a hot or cold coil and the other would be removed and replaced by a target sheet. Where I use a target sheet to replace one of the coils, that side would function as a bypass.

I have shown in the various units heating and cooling coils where I might change the position to have a cooling coil on one side of the unit at one time and it may be on the other side of the unit for another installation.

While I have shown an axial fan, it should be understood that I may use a blade or propeller fan, or a vaneaxial fan, or a centrifugal blower or any suitable type of prime mover of air which will give the required static pressure and air velocity to satisfy the design conditions of a given requirement. The fan or blower in detail is irrevelant to this unit.

A humidifier may be placed in the vortex generator downstream of the cooling coil or downstream of the unit or in any other desired location. This may be a steam grid type, spray type, perforated pipe or the like. Spray coil conditions may be obtained by using a series of spray nozzles on the cooling coil. These are incidental equipment which may be added or other special equipment may also be used.

Using the same basic air control module, together with other designed components, the unit is specifically adaptable to a multi-zone air conditioning unit, as in FIGS. 8 and 9, wherein numerous ducts transport cooled air or warmed air or an automatically controlled mixture of the two from a single multi-zone air handling fan and coil unit. The mixing or blending or the air being introduced into each duct supplying air to a particular zone is made possible and is controlled by individual opposed volume control dampers, which are integral to the environmental air control unit. The cooling medium may be in the cooling coil with no heating medium in the heating coil. This is a typical operation for summer or the cooling operation. Part of the air passes through the cooling coil and part through the opposite coil with total air mixing being controlled by proportioning dampers. The opposite operation takes place when the heating medium is in the heating coil in the winter or on the heating operation with no cooling medium in the cooling coil. The air will mix so the unit will deliver the correct temperature air. At other times there may be heating medium in the heating coil and at the same time there may be cooling medium in the cooling coil. The mixing dampers will control the amount of air to pass through each coil to deliver the right temperature of mixed air through the outlet and through the ducts.

Using the same basic air control module and other designed components, the unit is then specifically adaptable to a face and bypass unit, wherein one coil provides cooled air and the second or opposite coil provides heating. The heating coil may be replaced with a perforated target sheet. The amount of air passing through the bypass is controlled by the automatically controlled dampers to deliver the desired air temperature through the various openings or zones. Each opening, which is connected to different zones, is controlled separately to blend with the portion of air being cooled to obtain the desired air temperature to satisfy the area being supplied.

Making the unit specifically adaptable to any air conditioning installation or method of air conditioning is accomplished by merely adding to or removing certain designed components serving the same basic air control module. An illustration would be the elimination of the heating coil from a unit adaptable to a multi-zone system and substitution of a perforated target plate. The unit is then adaptable to a face and bypass system of air conditioning. Other designed applications of the basic air control module will be apparent.

I find it particularly advantageous in FIG. 9 to have the cold deck with a short chamber to the outlet, and the hot deck exhausting through the long bypass across the top or bottom of the unit. The hot coil is not as deep as the cold coil, therefore it has less resistance. The resistance to the cold coil will be about equal to the total of the resistance through the hot coil plus the resistance of its bypass. I have shown the bypass across the top of the unit in FIG. 9, but it should be understood that it might be underneath.

The path or flow of the air being controlled evenly through the coils is accomplished by adjustable, directional controllers and thus the air being conditioned is then expelled from the coils on the same plane at low, medium or high velocity or low, medium or high pressure to enter the vortex generator or generators.

While I have referred specifically to a target plate and/or target sheet, it should be understood that any suitable means for evening the air across the coils or as a directional controller may be used.

I refer to an inlet fan or discharge fan and indicate it to be attached to the unit. It should be understood that any suitable means of air prime mover, fan, blower, or the like may be attached or remotely connected to the unit.

I have shown the outlets and inlets as round, but it should be understood that they could be square, oblong, oval or the like. In any event, it is important to have a high inlet velocity and a high outlet velocity at a desired static pressure with a somewhat lower velocity through the coils. Having both coils in the same plane, as the inlet and outlet of the environmental air control unit, is very important. The arrangement makes for compactness, particularly in a vertical direction, and with the vortex generators on the outside, sound deadening is greatly simplified.

In FIG. 2, directional controllers 16 are disposed more or less in a V, each being a generally straight column or line. However, it should be understood that the column might be bowed one way or the other or otherwise formed. The advantage of bringing the controllers together in a V is that air will be progressively skimmed off or deflected from the entering column and evenly distributed across the coils. I also retard or prevent impingement on the back shroud and even-out the distribution and velocity across the coils with no unfavorable eddy currents at or around the outlet.

While I have shown a two coil unit with directional controllers in FIG. 2, I might use a similar setup of controlling the direction of air flow as in FIG. 6. In either arrangement, the outlet may be either forward or backward as in FIGS. 6 and 7.

Whereas I have shown and described the preferred form and several variations of my invention, it should be understood that suitable additional modifications, changes, substitutions and alterations may be made departing from the invention's fundamental theme.

I claim:

1. An air control module for use in an environmental air control unit including an inlet, a pair of coils in the module, one being a heating coil and the other being a cooling coil, one on each side of the inlet, both in unobstructed communication with, on both sides of and disposed generally parallel to the direction of the flow of air from the inlet, two banks of directional controllers in the module disposed in a V formation between the two coils, coming together at a point remote from the inlet, and straddling the inlet at the open end of the V, vanes in each of the directional controllers curved so that the velocity and quantity of air to and through the coils will be uniform along the entire length of the coil, at least one outlet in the module, the inlet, controllers, coils and outlet being in the same general plane, and at least one vortex generator chamber on the downstream side of one of the coils, each such generator being of a configuration such that the air discharge from its coil into the generator chamber will assume a spiral pattern when discharged from the air control unit.

2. The structure of claim 1 further characterized by and including a target plate positioned generally in the center of the air control module aligned generally with the inlet and at right angles to the flow of air coming from the inlet into the air control module to deflect the incoming air pattern and assist the directional controllers in uniformly distributing the air to and through the coils.

3. The structure of claim 1 further characterized by and including a pair of filter elements, one on each side of the air control module and positioned generally between one of the directional controllers and a coil, each filter element being disposed generally parallel to the coils.

4. The structure of claim 1 further characterized by and including a condensate drain pan and a condensate drain under an integral part of the air control module with the drain discharging from the housing.

5. The structure of claim 1 further characterized by and including two outlets on the housing, each located to one side of and generally parallel to the inlet.

6. The structure of claim 1 further characterized in that the outlet is disposed to exhaust air from the vortex generator chamber in the same general direction as it enters the housing through the inlet.

7. The structure of claim 1 further characterized in that each of the outlets is disposed around the housing to exhaust air therefrom in a direction generally 180° from the direction that the air enters the housing through the inlet.

8. The structure of claim 1 further characterized by and including an acoustical lining covered with a thin perforate metal cover inside each of the vortex generator chambers functioning as a sound attenuator.

9. In an environmental air control unit, a housing, an inlet in the unit adapted to be connected to a fan, and an air control module in the housing in unobstructed communication with the inlet, the module including a pair of coils in the housing, one on each side of the inlet, both in unobstructed communication with, on both sides of and disposed generally parallel to the direction of flow of air from the inlet, two banks of directional controllers in the module disposed in a V formation between the two coils, coming together at a point remote from the inlet, and straddling the inlet at the open end of the V, and vanes in each of the directional controllers curved so that the velocity and quantity of air to and through the coils will be uniform along the entire length of the coil, a vortex generator chamber on each side of the air control module, a side outlet on one of the vortex generator chambers at a position offset and remote from the center of the inlet and adapted to discharge air therefrom in a direction generally at right angles to the direction of entering air in the inlet, a bypass from the other vortex generator extending from the outside of the other vortex generator chamber back across the air control module the full width of the housing and merging into the side outlet so that the air from the two vortex generators will mix in the outlet.

10. The structure of claim 9 further characterized in that the air control module is made up of the inlet, the two directional controllers, the pair of coils with one on one side of the controllers and one on the other side, and further includes a pair of filters one between each of the controllers and the coils, a condensate drain pan as a part of the bottom of the module and a condensate drain attached thereto.

11. The structure of claim 9 further characterized in that one of the coils is a cooling coil and the other is a heating coil.

12. The structure of claim 9 further characterized by and including filters located on the downstream side of the coils.

13. The structure of claim 9 further characterized by and including filters located on the upstream side of the coils.

14. The structure of claim 9 further characterized in that the inlet, outlet, controllers, and coils are all located in the same general plane.

15. The structure of claim 9 further characterized by and including a damper structure inside the outlet in two sections, one including a series of dampers controlling the discharge from the said one vortex generator chamber and the other set controlling the discharge from the bypass, the dampers in one being set at an angle relative to the dampers in the other so that when one is closed the other is open and vice versa so that a mixing of the air from the two vortex generator chambers will automatically take place depending upon and in proportion to the position of the louvers.

16. The structure of claim 9 further characterized in that the outlet is in two sections, one from the bypass from the other vortex generator and the other from the first mentioned vortex generator with the two merging into a single outlet.

17. The structure of claim 9 further characterized in that the outlet includes a plurality of openings, side by side, and elongated in a direction generally parallel with the inlet, a plurality of dampers controlling the openings, and a control for controlling the dampers to provide a multi-zone unit.

18. The structure of claim 9 further characterized in that the side outlet on the said one vortex generator chamber is directed upwardly so as to merge with the bypass from the other vortex generator.

19. The structure of claim 9 further characterized in that one of the coils is replaced with a perforated target sheet, the other coil being constructed to operate as a heating coil in th winter and a cooling coil in the summer.

20. An air control module for use in an environmental air control unit, an inlet adapted to be connected to a fan, two banks in the module, one of them being a coil and the other being a target sheet, the coil being on one side of the inlet and the target sheet being on the other side with the coil and target sheet disposed in symmetrical relationship to the inlet and both being in unobstructed communication with the inlet, two banks of directional controllers in the module disposed in a V formation between the banks, coming together at a point remote from the inlet, and straddling the inlet at the open end of the V, and the vanes in each of the directional controllers being curved with the leading edges thereof generally parallel to the incoming air and the trailing edges elongated and directed generally at 90° to the incoming air so that the air will be deflected against and will enter the coil and target sheet normal to their front surfaces and the velocity and quantity of air to and through the coil and target sheet will be uniform along the entire length thereof.

21. The structure of claim 20 further characterized in that the coil is constructed to accept a heating medium in one season and a cooling in another.

22. An air control module for use in an environmental air control unit, an inlet adapted to be connected to a fan, a pair of coils in the module, one on each side of the inlet, one being a heating coil and the other being a cooling coil, in unobstructed communication with the inlet and in a V formation coming together at a point remote from the inlet, two banks of directional controllers in the module disposed in a V formation between the coils, coming together at a point remote from the inlet, and straddling the inlet at the open end of the V, and vanes in each of the directional controllers curved so that the velocity and quantity of air to and through the coils will be uniform along the entire length of the coils.

23. The structure of claim 22 further characterized by and including a pair of filters, one between each of the directional controllers and its adjacent coil.

24. The structure of claim 22 further characterized by and including a condensate drain pan in the base of the module, and a condensate drain connected thereto.

* * * * *